(12) United States Patent
Kang et al.

(10) Patent No.: US 11,880,317 B2
(45) Date of Patent: *Jan. 23, 2024

(54) PIM DEVICE, COMPUTING SYSTEM INCLUDING THE PIM DEVICE, AND OPERATING METHOD OF THE PIM DEVICE

(71) Applicant: Samsung Electronics Co., Ltd., Suwon-si (KR)

(72) Inventors: Shinhaeng Kang, Suwon-si (KR); Sukhan Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,441

(22) Filed: Jun. 21, 2022

(65) Prior Publication Data

US 2022/0318165 A1    Oct. 6, 2022

Related U.S. Application Data

(63) Continuation of application No. 16/869,853, filed on May 8, 2020, now Pat. No. 11,403,239.

(30) Foreign Application Priority Data

Dec. 30, 2019 (KR) .................. 10-2019-0178165

(51) Int. Cl.
*G06F 13/16* (2006.01)
*G06F 13/40* (2006.01)
*G06F 3/06* (2006.01)
*G06F 9/38* (2018.01)

(52) U.S. Cl.
CPC ........ *G06F 13/1668* (2013.01); *G06F 3/0655* (2013.01); *G06F 13/4027* (2013.01); *G06F 9/3877* (2013.01)

(58) Field of Classification Search
CPC ............... G06F 13/1668; G06F 3/0655; G06F 13/4027; G06F 9/3877; G06F 15/7821; G06F 9/3004; G06F 9/30105; G06F 15/7842; Y02D 10/00
See application file for complete search history.

(56) References Cited

U.S. PATENT DOCUMENTS

| 7,647,376 | B1* | 1/2010 | Jagger .................. H04L 51/212 709/206 |
| 7,805,663 | B2 | 9/2010 | Brandman et al. |
| 9,997,232 | B2 | 6/2018 | Murphy |
| 10,185,499 | B1 | 1/2019 | Wang et al. |
| 10,949,321 | B1* | 3/2021 | Volpe ................. G06F 11/0793 |

(Continued)

FOREIGN PATENT DOCUMENTS

| KR | 10-2009-0096412 A | 9/2009 |
| KR | 10-2013-0096753 A | 8/2013 |

*Primary Examiner* — Farley Abad
(74) *Attorney, Agent, or Firm* — NSIP Law

(57) ABSTRACT

A processing in memory (PIM) device includes a memory configured to receive data through a first path from a host processor provided outside the PIM device, and an information gatherer configured to receive the data through a second path connected to the first path when the data is transferred to the memory via the first path, and to generate information by processing the data received through the second path.

18 Claims, 6 Drawing Sheets

(56) References Cited

U.S. PATENT DOCUMENTS

| | | | |
|---|---|---|---|
| 2001/0046260 A1* | 11/2001 | Molloy | H04N 19/61 |
| | | | 375/E7.093 |
| 2005/0013181 A1 | 1/2005 | Adelmann et al. | |
| 2005/0050269 A1* | 3/2005 | Horn | G06F 11/3409 |
| | | | 711/113 |
| 2006/0080485 A1 | 4/2006 | TaWara et al. | |
| 2006/0217115 A1* | 9/2006 | Cassett | H04L 43/0829 |
| | | | 455/423 |
| 2010/0199109 A1* | 8/2010 | Terek | G06F 3/0671 |
| | | | 713/194 |
| 2014/0013029 A1* | 1/2014 | Tsui | G06F 11/1428 |
| | | | 711/E12.008 |
| 2016/0041778 A1* | 2/2016 | Li | G06F 3/0616 |
| | | | 711/114 |
| 2016/0188405 A1 | 6/2016 | Li et al. | |
| 2017/0063394 A1 | 3/2017 | Halbert et al. | |
| 2018/0190382 A1* | 7/2018 | Ramezani | G16H 50/20 |
| 2018/0322938 A1* | 11/2018 | Kim | G11C 29/50004 |
| 2019/0272121 A1 | 9/2019 | Khan et al. | |
| 2019/0294567 A1 | 9/2019 | Khan et al. | |
| 2021/0089390 A1* | 3/2021 | Lee | G06F 11/1048 |

* cited by examiner

PIM DEVICE, COMPUTING SYSTEM INCLUDING THE PIM DEVICE, AND OPERATING METHOD OF THE PIM DEVICE

CROSS-REFERENCE TO RELATED APPLICATION

This application is a continuation of application Ser. No. 16/869,853 filed on May 8, 2020, which claims the benefit under 35 USC § 119(a) of Korean Patent Application No. 10-2019-0178165, filed on Dec. 30, 2019, in the Korean Intellectual Property Office, the entire disclosure of which is incorporated herein by reference for all purposes.

BACKGROUND

1. Field

The present disclosure relates to process in memory (PIM) devices, computing systems including the PIM devices, and methods of operating the PIM devices.

2. Description of Related Art

Functions of semiconductor memory devices have been separated from the functions of a processor that performs computational operations. Accordingly, for applications such as neural networks, big data, and the Internet of things (IoT), which require operations on large amounts of data, data bottlenecks frequently occur as a large amount of data is transmitted and received between a semiconductor memory device and a processor.

In order to solve such a problem, a research on a process in memory (PIM) as a semiconductor memory device in which memory functions are combined with the functions of a processor performing various computational operations is being conducted.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processing in memory (PIM) device including a memory configured to receive data through a first path from a host processor provided outside the PIM device, and an information gatherer configured to receive the data through a second path connected to the first path when the data is transferred to the memory via the first path, and to generate information by processing the data received through the second path.

The memory may be configured to return the data and the information gatherer is further configured to return the information according to a request of the host processor.

According to a request of the host processor, the memory may return the data to the host processor through the first path, and the information gatherer may return the information to the host processor through the second path.

According to a request of the host processor, the memory may return the data to the host processor via a third path, and the information gatherer may return the information to the host processor through a fourth path that connects the third path to the information gatherer.

The PIM device may include a memory buffer to temporarily store the data transferred from the host processor, wherein the memory buffer may transfer the data to the memory through the first path and may transfer the data to the information gatherer through the second path.

The information gatherer may include a processor configured to process the data to generate the information, and at least one register configured to store settings regarding the information, the settings being received from the host processor.

The information gatherer may include at least one of an enabling register to store information whether or not to gather the information from the data, a range register to store a range for gathering the information, a mask register to store a type of information, or an information register file to store the information generated according to the settings.

The PIM device may be any one of a dynamic random access memory (DRAM), a high band memory (HBM), or a load reduced dual in-line memory module (LRDIMM).

In another general aspect, there is provided a computing system including a host processor, and a processing in memory (PIM) device comprising a memory to receive data from the host processor and an information gatherer configured to receive the data and to generate information by processing the data, wherein the PIM device is configured to transfer the data to the memory via a first path and to transfer the information to the information gatherer via a second path connected to the first path, the host processor requests any one or any combination of the data and the information from the PIM device, and the PIM device is further configured to return the data from the memory in response to a request for the data, and to return the information from the information gatherer in response to a request for the information.

In another general aspect, there is provided an operating method of a processing in memory (PIM) device, the operating method including transferring data received from a host processor provided outside the PIM device to a memory through a first path, transferring the data to an information gatherer via a second path connected to the first path, in response to the data being transferred to the memory via the first path, and generating information by processing the data by the information gatherer.

The operating method may include returning the data from the memory or returning the information from the information gatherer according to a request of the host processor.

The returning of the data from the memory may include returning the data to the host processor through the first path, and the returning of the information from the information gatherer may include returning the information to the host processor through the second path.

The returning of the data from the memory may include returning the data to the host processor through a third path, and the returning of the information from the information gatherer may include returning the information to the host processor through a fourth path that connects the third path to the information gatherer.

The operating method may include temporarily storing the data transferred from the host processor to a memory buffer, and transferring the data stored at the memory buffer to the memory through the first path and to the information gatherer through the second path.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
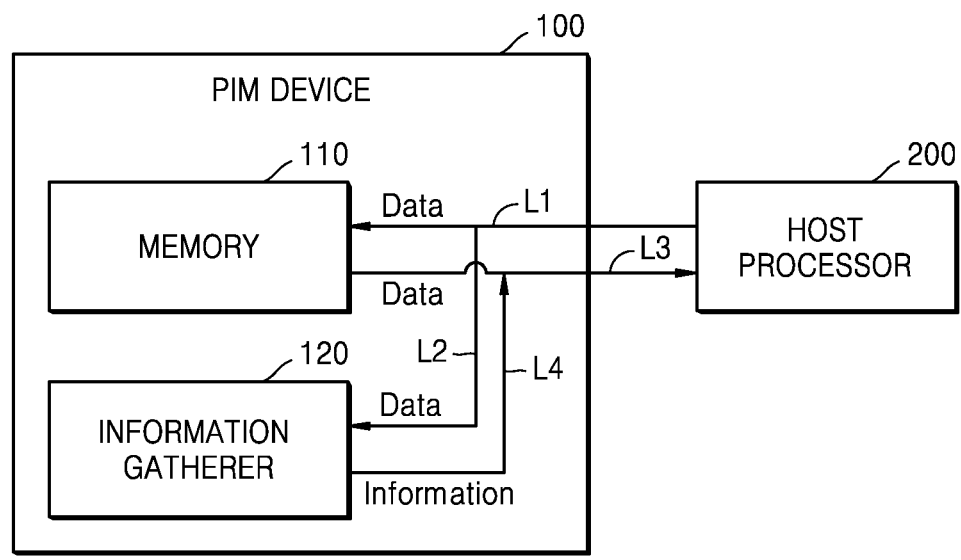
FIG. 1 is a diagram of illustrating an example of a configuration of a computing system including a PIM device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when an element, such as a layer, region, or substrate, is described as being "on," "connected to," "electrically connected to" or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 is a diagram of illustrating an example of a configuration of a computing system 1000 including a PIM device 100.

Referring to FIG. 1, the computing system 1000 may include a host processor 200 and the PIM device 100. In the computing system 1000 in FIG. 1, although only components related to the embodiments are shown, but it should be understood that other general purpose components, such as, for example, an interfacing module for connecting with other electronic devices, an input/output module for receiving user input and outputting information may be used without departing from the spirit and scope of the illustrative examples described.

The computing system 1000 may be various devices and/or systems such as, for example, a smart phone, a mobile phone, a wearable device, (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, a smart speaker, a robot, various Internet of Things (IoT) devices, or a kiosk and may be performed by an application, middleware, or an operating system installed on a user device, or a program of a server interoperating with the corresponding application.

The host processor 200 is, for example, a hardware apparatus configured to execute instructions or programs, or to control an overall operation of the computing system 1000. The host processor 200 may include one processor core (single core) or a plurality of processor cores (multicore). The host processor 200 may be implemented as a central processing unit (CPU), a graphic processing unit (GPU), an application processor (AP), a reconfigurable processor, a multicore processor, a multiprocessor, an application-specific integrated circuit (ASIC), and a field programmable gate array (FPGA), or any other type of multi- or single-processor configuration.

The host processor 200 may process or execute programs and/or data stored in the PIM device 100. In an example, the host processor 200 may control the function of a neural network device by executing programs stored in the PIM device 100.

The host processor 200 may include a memory controller for controlling the PIM device 100. The memory controller controls the operation of a memory device by applying a command CMD and an address ADDR to control the memory device.

When writing data, the host processor 200 may transfer data to be written and an address corresponding to a memory space in which each data is to be stored to the PIM device 100. The PIM device 100 may write data in a memory space corresponding to a received address. When reading data, the host processor 200 may transmit an address corresponding to a memory space in which data to be read is written to the PIM device 100 and may receive the data stored in the corresponding address from the PIM device 100.

The computing system 1000 may further include an input/output device (I/O device) (not shown), and in an example, the host processor 200 may include control the I/O device and the PIM device 100 according to a memory-mapped I/O (MMIO) method.

The host processor 200 may transfer various data through a path connecting the host processor 200 and the PIM device 100. For example, the host processor 200 may transfer various data and information to the PIM device 100 through a data bus for transmitting data and a control bus for transmitting a command CMD and an address ADDR.

The PIM device 100 may store programs, data, or instructions. In another example, the PIM device 100 may store input values required for a computation process of a neural network device and intermediate and final results generated as a result of the computation.

The PIM device 100 may include a memory 110 that stores data received from the host processor 200 provided outside the PIM device 100, and an information gatherer 120 that acquires data transferring to the memory 110 on a data bus and processes the acquired data.

The PIM device 100 may include other general components in addition to the components shown in FIG. 1. For example, the PIM device 100 may further include an internal processor packaged together in a chip package of the memory 110 to process data therein and a memory buffer to temporarily store the transferred data.

In an example, the PIM device 100 may correspond to random access memory (RAM), such as, for example, dynamic random access memory (DRAM), static random access memory (SRAM), read-only memory (ROM), electrically erasable programmable read-only memory, or a device, such as, for example, High Bandwidth Memory (HBM), Load Reduced Dual In-line Memory Module (LRDIMM).

The memory 110 may receive and store data from the host processor 200 provided outside the PIM device 100. Types of data to be received and stored by the memory 110 may vary. For example, the memory 110 may receive and store data such as, for example, voice recognition data, image data, and biometric information.

In an example, the memory 110 may receive data from the host processor 200 through a path L1. The path L1 is a data moving path, for example, may be a data bus. The memory 110 stores data as-received through the path L1. In other words, when receiving data, the memory 110 stores the data without performing an additional operation or processing.

The memory 110 may return data at a request of the host processor 200. In this case, the memory 110 may return data through a path L3.

In an example, the path L1 through which the memory 110 receives data and the path L3 for returning data may be the same path. In an example, the path L1 for receiving data for the memory 110 and the path L3 for returning the data may be designed differently in consideration of factors such as, electronic components through which the data passes for data processing and other paths that cross each other.

In an example, the memory 110 may be configured as a memory array including a plurality of memories 110, and the memory array may form a memory bank. The host processor 200 may independently access each of the memory banks.

The information gatherer 120 may include a processor that performs data processing and computation and a memory device that stores information generated from data. Since the processor of the information gatherer 120 is designed according to a PIM architecture implemented along with the memory 110 on a single chip, it is possible to have a fast memory access with a low-latency. The memory device of the information gatherer 120 may be implemented along with various types of the memory 110, and the memory device may be, for example, SRAM or a register.

When data is transferred from the host processor 200 to the memory 110 of the PIM device 100, the information gatherer 120 may receive the data through a path L2 that is connected to the path L1.

The host processor 200 may access the information gatherer 120 by using an address assigned to the information gatherer 120 according to a MMIO method and may write data or read information in the information gatherer 120.

The processor of the information gatherer 120 may process the received data to generate information and store the generated information in a register. The information generated from the data is less than the data itself, and thus, may be temporarily stored in the register of the information gatherer 120.

Data received by the information gatherer 120 and information generated from the data may vary. In an example, the data received by the information gatherer 120 may include data such as, for example, voice recognition data, image data, and biometric information.

In an example, the information gatherer 120 may generate statistical information from data. The statistical information generated by the information gatherer 120 may be used to perform neural network related functions in the host processor 200, which will be described in detail with reference to FIG. 2.

It is inefficient for the host processor 200 to read all of the data stored in the memory 110 in the PIM device 100 to generate information. Accordingly, when the host processor 200 transmits data to the memory 110 to write the data in the memory 110, the information gatherer 120 may also receive the data and may generate information by processing the data.

Thereafter, the information gatherer 120 may provide information according to a request of the host processor 200. The host processor 200 may read data written in an address of the memory 110 by transferring the address of the memory 110 to the PIM device 100 and may read information written at the address of the information gatherer 120 by transferring the address of the information gatherer 120.

As a result, the PIM device 100 may generate information through a single data processing process by using the information gatherer 120. Execution time and energy needed for processing data and generating information may be reduced by providing information stored in the information gatherer 120 without additional operation in response to repeated information read request from the host processor 200.

In an example, the information gatherer 120 may return the generated information to the host processor 200 through a path L4 in response to a request of the host processor 200. In an example, the path L4 may be connected to the path L3 through which the memory 110 returns data.

In an example, the path L2 through which the information gatherer 120 receives data and the path L4 for returning the information may be the same path. In another example, the path L2 through which the information gatherer 120 receives data and the path L4 for returning the information may be designed differently in consideration of electronic components for data processing and crossing other paths.

In an example, the memory 110 may include a plurality of memory banks, and the plurality of information gatherers 120 may each be independently connected to the memory bank. Accordingly, each of the information gatherers 120 may generate information by processing data received from the connected memory bank. As a result, when each of the plurality of information gatherers 120 is independently connected to the memory bank, information may be generated in units of memory banks, and thus, resolution may be increased when compared to generating information in units of the entire memory 110.

The PIM device 100 may further include a memory buffer. To address differences in transfer rates that may occur between the respective components in the PIM device 100 and the host processor 200, a memory buffer may temporarily store data and information transferred between the host processor 200 and the PIM device 100.

In detail, the memory buffer may temporarily store data transferred from the host processor 200 to the memory 110, data transferred from the host processor 200 to the information gatherer 120, data transferred from the memory 110 to the host processor 200, and Information transmitted from the information gatherer 120 to the host processor 200.

In an example, the memory buffer may be located on the paths L1, L2, L3, and L4 or may be connected to the paths L1, L2, L3, and L4. The memory buffer may transfer data to the memory 110 via the path L1, may transfer data to the information gatherer 120 via the path L2, may transfer data from the memory 110 to the host processor 200 via the path L3, and may transfer information from the information gatherer 120 to the host processor 200 via the path L4.

Figure 2:
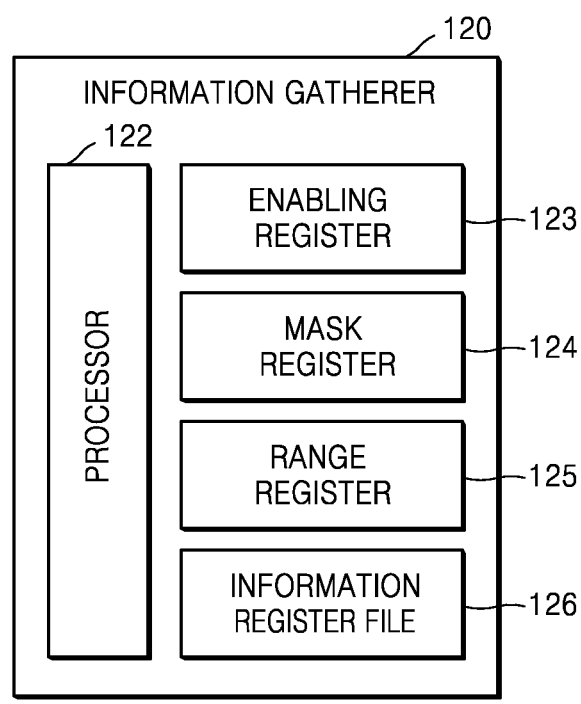
FIG. 2 is a diagram illustrating an example of a configuration of an information gathering unit in a PIM device.

FIG. 2 is a diagram illustrating an example of a configuration of the information gatherer 120 in the PIM device 100.

Referring to FIG. 2, a processor 122 and a plurality of registers may be included in the information gatherer 120.

The information gatherer 120 may increase a data processing speed of the processor 122 connected to the registers by writing information to a register which is a high speed storage device. The register may store intermediate results during data processing and final results of the processor 122.

The host processor 200 may control the operation of the information gatherer 120 and settings regarding information through registers. Depending on the operation of the information gatherer 120 and the settings regarding the information, the number and type of registers may be varied. In an example, the host processor 200 may receive settings from a user and transfer the settings to each register. Each register may store the transmitted settings. Each register has a unique address, and the host processor 200 may transmit the settings of the information gatherer 120 and an address of the register in which the settings are to be stored to the PIM device 100.

In an example, the information gatherer 120 may include at least any one of an enabling register 123, a mask register 124, a range register 125, and an information register file 126.

In an example, the enabling register 123 may store settings regarding whether information gathering is performed from data or not. The host processor 200 may control the enablement of the information gatherer 120 through the enabling register 123.

The mask register 124 may store settings regarding the type of information to be generated from the data. The host processor 200 may control the type of information to be generated from the information gatherer 120 through the mask register 124. For example, when the information gatherer 120 generates statistical information from data, the mask register 124 may set the type of statistical information to be generated, such as minimum and maximum values of the data, a sum of the data, a sum of the squares of the data, the number of zeros in the data. The minimum and maximum values of the data may be used for quantization, the sum of the data and the sum of the squares of the data may be used for normalization, and the number of zeros in the data may be used for load balancing of the processor.

The range register 125 may store settings regarding a range of data for generating information. The host processor 200 may control a range of addresses of data for generating information through the range register 125. For example, when the information gatherer 120 generates statistical information from the image data, the range register 125 may set a pixel area of an image data to generate the statistical information.

The information register file 126 is a gathering of a plurality of registers and may store information generated from data. The information register file 126 may return the stored information at the request of the host processor 200.

Figure 3:
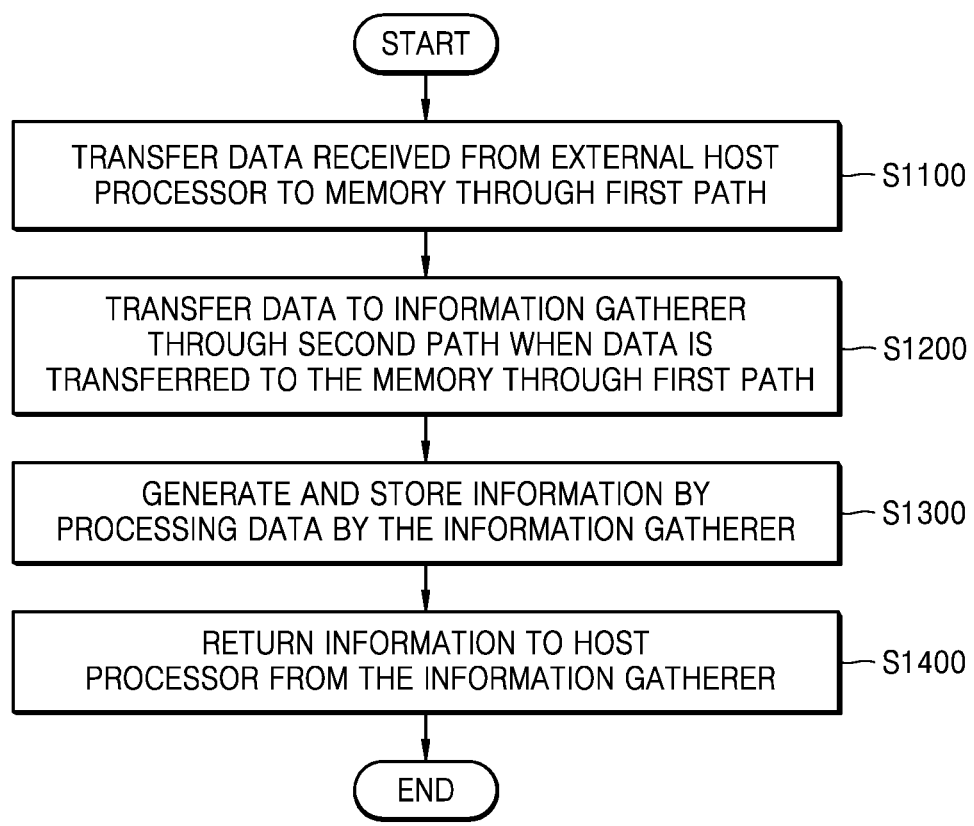
FIG. 3 is a diagram illustrating an example of an operating method of a PIM device.

FIG. 3 is a diagram illustrating an example of a method of operating the PIM device 100. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. The blocks of the image processing method of FIG. 3, and combinations of the blocks, are performed by an image processing apparatus. In an example, the image processing apparatus is implemented by special purpose hardware-based computer, and devices such as a processor, that perform the specified functions, or combinations of special purpose hardware and computer instructions included in the image processing apparatus. In addition to the description of FIG. 3 below, the descriptions of FIGS. 1-2 is also applicable to FIG. 3 and are incorporated herein by reference. Thus, the above description may not be repeated here.

Referring to FIG. 3, the PIM device 100 may transfer data received from the host processor 200 provided outside the PIM device 100 to the memory 110 through a first path (S1100). The first path is a path L1 connecting the host processor 200 to the memory 110.

The PIM device 100 may receive data and an address through the path L1 connecting the host processor 200 to the memory 110 and write data to the memory 110 designated according to the address. The PIM device 100 stores data in the memory 110 as it is received without processing the data. Afterwards, the PIM device 100 may return at least some of the data received from the memory 110 at the request of the host processor 200.

When data is transferred to the memory 110 through the first path, the PIM device 100 may transfer data to the information gatherer 120 through a second path (S1200). The second path is a path L2 connecting the path L1 and the information gatherer 120.

The PIM device 100 may generate and store information (S1300). The host processor 200 may receive input from a user such as, for example, whether to generate information from data, a range, type of information to be generated. The host processor 200 may transfer inputs received from the user to the PIM device 100. The PIM device 100 may store inputs received from a user in a register of the information gatherer 120 and generate information from data according to the inputs received from the user.

The PIM device 100 may return information from the information collecting unit 120 according to a request of the host processor 200 (S1400). As a result, the PIM device 100 may generate information in advance by a single data processing through the information gatherer 120, and provide the information for a plurality of information read requests of host processor 200 without an additional operation. This operation increases the efficiency and speed of procession because the need of processing the data at a host processor after reading the data from the memory device through the host processor is eliminated to generate information from data written in a memory device.

In the computing system 1000 including the PIM device 100, information may be generated from data without additional access to the memory 110, thereby reducing execution time and energy.

Also, the information gatherer 120 may be applied to a memory device without modifying an interface of the memory device, and thus, is advantageous for introduction to the memory device.

Figure 4:
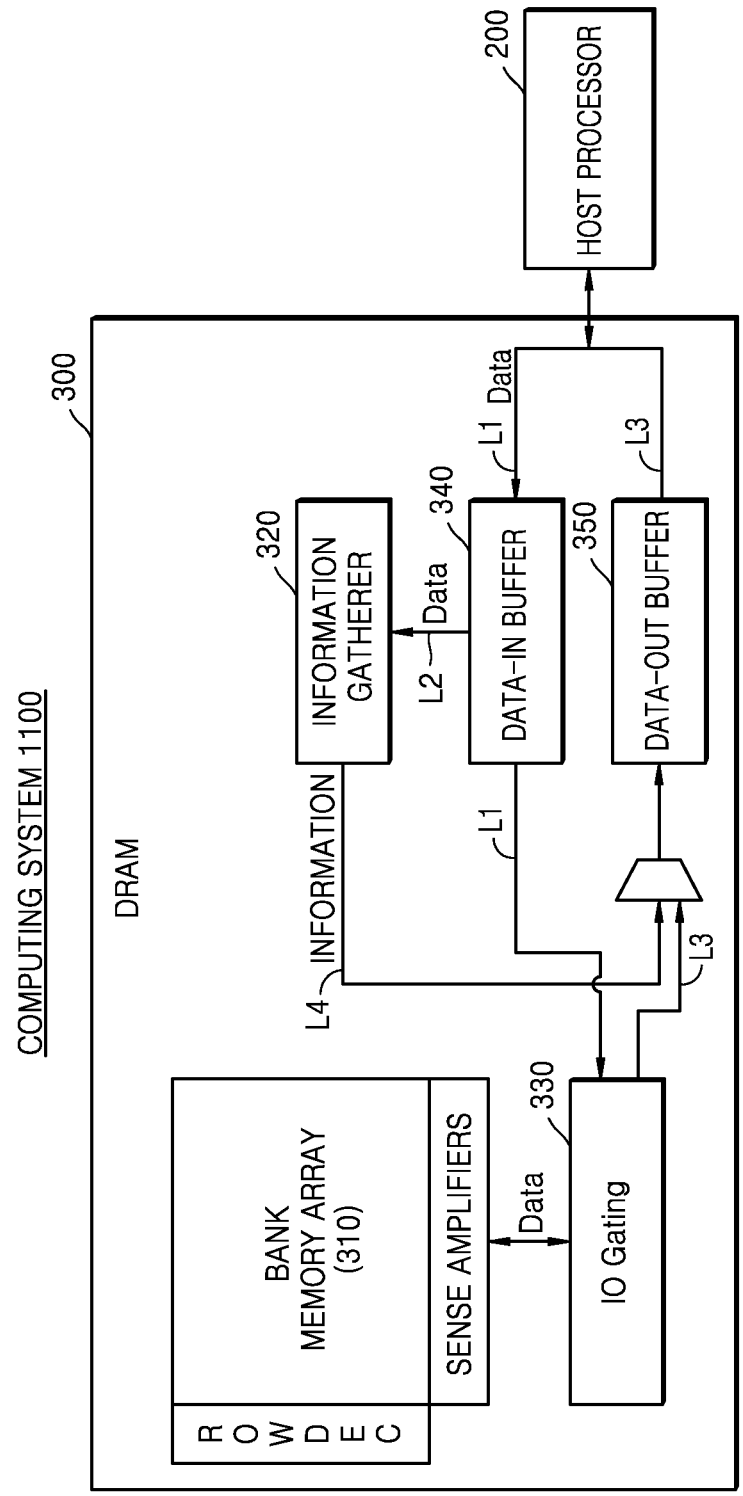
FIG. 4 is a diagram illustrating an example of a configuration of a computing system including a DRAM.

FIG. 4 is a diagram illustrating an example of a configuration of a computing system 1100 including a DRAM 300.

Referring to FIG. 4, the PIM device 100 is the DRAM 300. The DRAM 300 may include various types, such as SDRAM, RDRAM, DDR SDRAM, LRDIMM, and HBM, and FIG. 4 describes the application of an information gatherer 320 to a write and read path of a general DRAM.

Descriptions given with reference to FIGS. 1 to 3 may be applied to the computing system 1100 including the DRAM 300 of FIG. 4. In addition to the description of FIG. 4 below, the descriptions of FIGS. 1-3 is also applicable to FIG. 4 and are incorporated herein by reference. Thus, the above description may not be repeated here. A data-in buffer 340 and the data-out buffer 350 are one type of memory buffer. The data-in buffer 340 may temporarily store data transferred from the host processor 200 to a bank memory array 310. The data out buffer 350 may temporarily store data transferred from the bank memory array 310 to the host processor 200.

The DRAM 300 may receive data from the host processor 200 through a path L1 connected to the data-in buffer 340 and write the data to the bank memory array 310. The DRAM 300 may return data from the bank memory array 310 to the host processor 200 through a path L3 connected to the data-out buffer 350. At this time, an I/O gate 330 is a kind of buffer and temporarily stores data to be read and written.

The DRAM 300 may provide data to the information gatherer 320 through a path L2 connected to the data-in buffer 340. The DRAM 300 may return information generated from the data from the information gatherer 320 to the host processor 200 through a path L4 connected to the data-out buffer 350.

Figure 5:
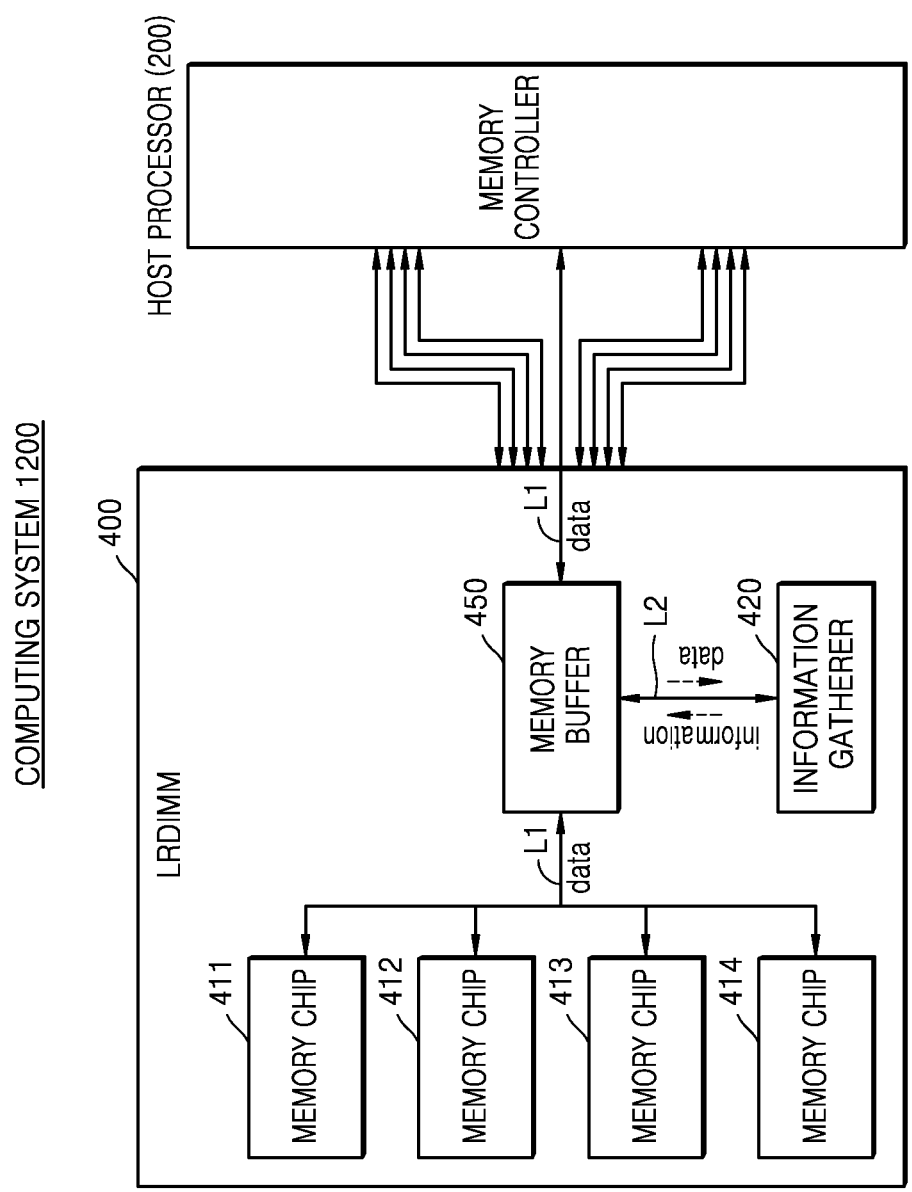
FIG. 5 is a diagram illustrating an example of a configuration of a computing system including an LRDIMM.

FIG. 5 is a diagram illustrating an example of a configuration of a computing system 1200 including an LRDIMM 400.

Referring to FIG. 5, the PIM device 100 is the LRDIMM 400. The LRDIMM 400 includes a memory buffer 450. The LRDIMM 400 may distribute a load by sequentially arranging the load in the memory buffer 450 without depending on rank.

The LRDIMM 400 is a type of DRAM. FIG. 5 shows an information gatherer 420 that is applied to the memory buffer 450 of the LRDIMM 400. Descriptions given with reference to FIGS. 1 to 3 may be applied to the computing system 1200 including the LRDIMM 400 of FIG. 5. In addition to the description of FIG. 5 below, the descriptions of FIGS. 1-3 is also applicable to FIG. 5 and are incorporated herein by reference. Thus, the above description may not be repeated here.

The LRDIMM 400 may write data to memory chips 411, 412, 413, and 414 from the host processor 200 through a path L1 or read data from the memory chips 411, 412, 413, and 414. The LRDIMM 400 may write data in the information gatherer 420 through a path L2, or read information generated by processing data from the information gatherer 420.

The memory buffer 450 may temporarily store data transferred from the host processor 200 to the memory chips 411, 412, 413, and 414. When the data is transferred to the memory chips 411, 412, 413, and 414 through the memory buffer 450, the information gatherer 420 may receive data from the memory buffer 450. Also, the information gatherer 420 may return information generated by processing the data to the host processor 200 through the memory buffer 450.

Figure 6:
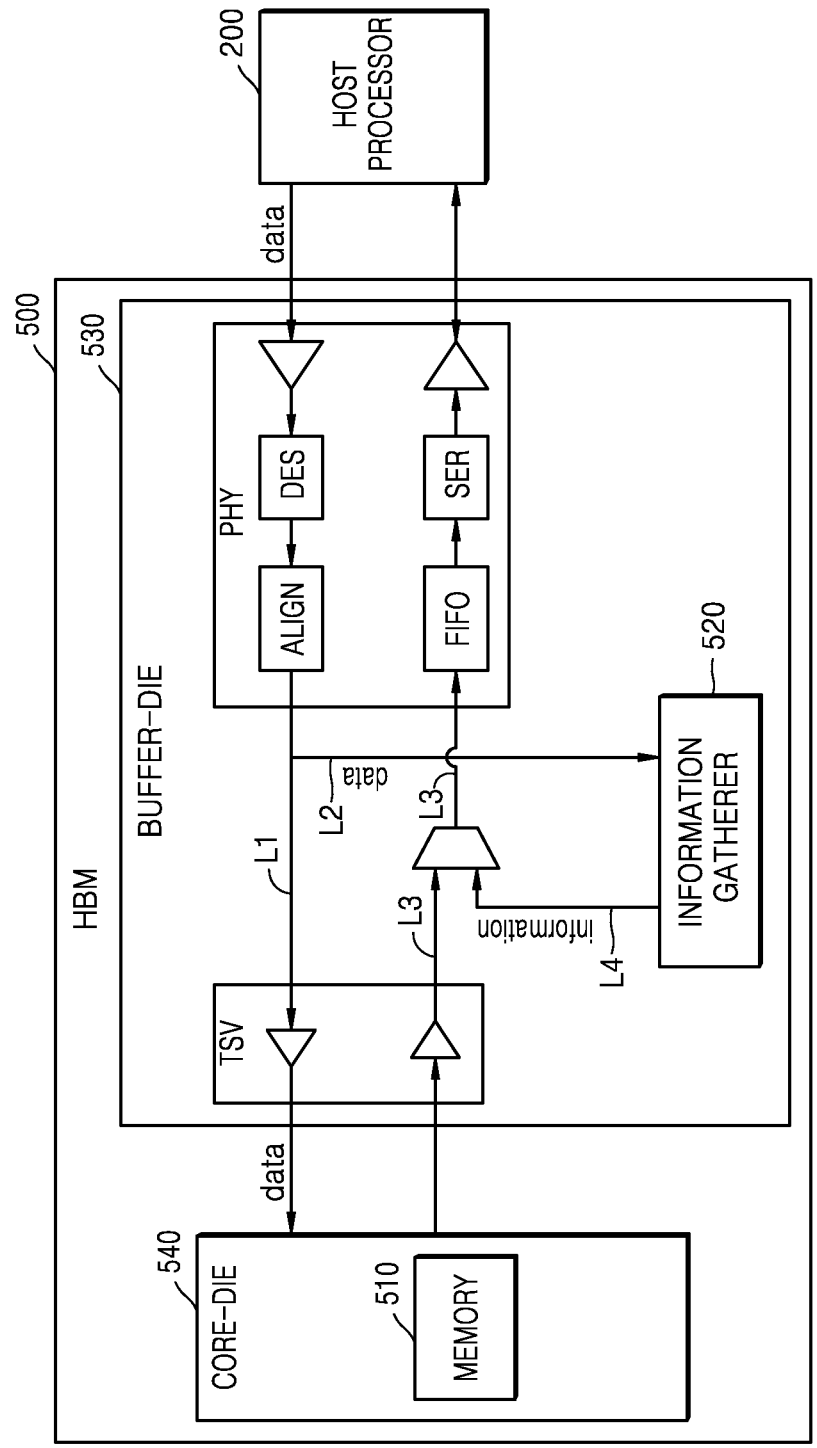
FIG. 6 is a diagram illustrating an example of a configuration of a computing system including an HBM.

FIG. 6 is a diagram illustrating an example of a configuration of a computing system 1300 including an HBM 500.

Referring to FIG. 6, the PIM device 100 is an HBM 500. The HBM 500 is a type of DRAM. In FIG. 6, an information gatherer 520 is applied to a buffer-die 530 of the HBM 500. Descriptions given with reference to FIGS. 1 to 3 may be applied to the computing system 1300 including the HBM 500. In addition to the description of FIG. 6 below, the descriptions of FIGS. 1-3 is also applicable to FIG. 6 and are incorporated herein by reference. Thus, the above description may not be repeated here.

The HBM 500 stacks a plurality of core-dies 540 including a memory 510, and may perform communication between the memory 510 and a host processor 200 through a through silicon via (TSV) of the core-die 540. The HBM 500 may include a buffer-die 530 that performs as an interface between the core-dies 540 and the host processor 200.

The HBM 500 may receive data from the host processor 200 through a path L1 provided inside the buffer-die 530 and transfer the data to the core-dies 540. The HBM 500 may receive data from the host processor 200 through a deserializer DES and alignment ALIGN that convert data in a physical layer PHY into a parallel form.

The HBM 500 may return data from the core-dies 540 to the host processor 200 via a path L3 provided inside the buffer-die 530. The HBM 500 may transfer data from the core-dies 540 to the host processor 200 through a serializer SER that converts a first-in first-out (FIFO) buffer and data of the physical layer PHY into a serial form.

The information gatherer 520 of the HBM 500 may be disposed in the buffer-die 530. The HBM 500 may transfer data received from the host processor 200 to the information gatherer 520 through a path L2 that is provided inside the buffer-die 530 and is connected to the path L1. The path L2 may be connected to one point of the path L1 located after the physical layer PHY based on a data flow direction.

The HBM 500 may transfer information generated from data in the information gatherer 520 to the host processor 200 through a path L4 that is provided inside the buffer-die 530 and is connected to the path L3. The path L4 may be connected to one point of the path L3 located before the physical layer PHY based on the data flow direction.

Instructions or software to control a processor to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter.

Instructions or software to control The above-described method of operating the PIM device 100 may be recorded in a non-transitory computer-readable recording medium are written as computer programs, code segments, instructions or any combination thereof, for individually or collectively instructing or configuring the PIM device 100 to operate as a machine or special-purpose computer to perform the operations performed by the hardware components and the methods as described above. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above. Examples of non-transitory computer-readable recording media include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

According to the present disclosure, when writing data received from an external device to a memory device, a PIM device generates information by processing the data and stores the information, and afterwards, the PIM device may return the generated information to the external device without additional access to the memory device. As a result, an execution time and energy required for data processing and information generation may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processing in memory (PIM) device comprising:
a memory configured to receive data from a host processor provided outside the PIM device; and
an information gatherer, distinguished from the memory, configured to receive the data, and to generate information about the data by processing the data;
wherein according to a request of the host processor:
the memory returns the data to the host processor through a first path, and
the information gatherer returns the generated information to the host processor through another path, distinguished from the memory, that connects to the first path.

2. The PIM device of claim 1, wherein the memory is further configured to receive an address from the host processor and to store the data according to the address.

3. The PIM device of claim 2, wherein the memory is further configured to store the data as it is received without processing the data.

4. The PIM device of claim 1, wherein the information gatherer comprises a processor configured to process the data to generate the information, and at least one register configured to store settings regarding the information, the settings being received from the host processor.

5. The PIM device of claim 4, wherein the information gatherer is further configured to receive address from the host processor and to store the settings according to the address.

6. The PIM device of claim 4, wherein the information gatherer is further configured to generate the information about the data according to the setting.

7. The PIM device of claim 1, wherein the information gatherer is further configured to generate statistical information from the data, used to perform neural network related functions in the host processor.

8. The PIM device of claim 7, wherein the information gatherer comprises at least one of an enabling register to store information whether or not to gather the information from the data, a range register to store a range for gathering the information, a mask register to store a type of the statistical information, or an information register file to store the information generated according to settings.

9. The PIM device of claim 8, wherein the type of the statistical information is minimum and maximum values of the data, a sum of the data, a sum of the squares of the data, the number of zeros in the data.

10. The PIM device of claim 9, wherein the minimum and maximum values of the data is used for quantization, the sum of the data and the sum of the squares of the data is used for normalization, and the number of zeros in the data is used for load balancing of a processor in the information gatherer.

11. The PIM device of claim 1, wherein the data is received by the PIM device for the receipt of the data by the memory and the receipt of the data by the information gatherer.

12. The PIM device of claim 1, wherein one end of the another path is directly connected to the information gatherer and another end of the another path is directly connected to the first path.

13. A computing system comprising:
 a host processor; and
 a processing in memory (PIM) device comprising:
  a memory configured to receive data from the host processor; and
  an information gatherer, distinguished from the memory, configured to receive the data and to generate information about the received data by processing the data,
 wherein according to a request of the host processor, the memory returns the data to the host processor through a first path, and the information gatherer returns the generated information to the host processor through another path, distinguished from the memory, that connects to the first path.

14. The computing system of claim 13, wherein the data is received by the PIM device for the receipt of the data by the memory and the receipt of the data by the information gatherer.

15. The computing system of claim 13, wherein one end of the another path is directly connected to the information gatherer and another end of the another path is directly connected to the first path.

16. An operating method of a processing in memory (PIM) device, the operating method comprising:
 transferring data received from a host processor provided outside the PIM device to a memory and an information gatherer that is distinguished from the memory;
 generating information by processing the data by the information gatherer; and
 selectively, in response to a request of the host processor, returning the data from the memory to the host processor through a first path and returning the generated information from the information gatherer to the host processor through another path that is distinguished from the memory and is connected to the first path.

17. The operating method of claim 16, wherein the data is received by the PIM device for the receipt of the data by the memory and the receipt of the data by the information gatherer.

18. The operating method of claim 16, wherein one end of the another path is directly connected to the information gatherer and another end of the another path is directly connected to the first path.

* * * * *